United States Patent
Salter et al.

(10) Patent No.: US 12,043,091 B2
(45) Date of Patent: Jul. 23, 2024

(54) SUMMER VENTING WINDOW

(71) Applicant: Ford Global Technologies, LLC, Dearborn, MI (US)

(72) Inventors: Stuart C. Salter, White Lake, MI (US); Chester Stanislaus Walawender, Livonia, MI (US); John Walawender, Charlotte, NC (US); Hussein Berry, Dearborn, MI (US); Paul Kenneth Dellock, Northville, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 17/879,367

(22) Filed: Aug. 2, 2022

(65) Prior Publication Data
US 2022/0371411 A1    Nov. 24, 2022

Related U.S. Application Data

(62) Division of application No. 16/993,728, filed on Aug. 14, 2020, now Pat. No. 11,433,744.

(60) Provisional application No. 62/896,928, filed on Sep. 6, 2019.

(51) Int. Cl.
*B60J 1/18* (2006.01)
*B60J 1/20* (2006.01)

(52) U.S. Cl.
CPC .......... *B60J 1/1853* (2013.01); *B60J 1/2011* (2013.01)

(58) Field of Classification Search
CPC .................................................... B60J 1/1853
USPC ................................. 296/146.16; 49/380, 413
See application file for complete search history.

(56) References Cited

U.S. PATENT DOCUMENTS

| | | | |
|---|---|---|---|
| 2,079,138 A | 5/1937 | Winn | |
| 2,568,800 A | 9/1951 | Galla | |
| 2,704,121 A | 3/1955 | Maidhof et al. | |
| 4,799,422 A | 1/1989 | Birt | |
| 5,192,112 A | 3/1993 | Gherardi et al. | |
| 5,469,906 A | 11/1995 | Cason | |
| 5,570,542 A | 11/1996 | Cameron | |
| 6,016,861 A | 1/2000 | Davis | |
| 6,026,611 A * | 2/2000 | Ralston | E05F 11/535 49/123 |
| 6,125,585 A | 10/2000 | Koneval et al. | |
| 6,276,426 B1 | 8/2001 | Polak | |
| 6,766,617 B2 * | 7/2004 | Purcell | B60J 1/1853 49/360 |
| 6,803,733 B1 | 10/2004 | Shabana et al. | |
| 7,029,055 B2 | 4/2006 | Bourque et al. | |
| 8,510,993 B2 * | 8/2013 | Mellary | B60J 1/1853 49/380 |

(Continued)

FOREIGN PATENT DOCUMENTS

KR    20030015106 A    2/2003

*Primary Examiner* — Jason S Morrow
(74) *Attorney, Agent, or Firm* — Vichit Chea; Carlson, Gaskey & Olds, P.C.

(57) ABSTRACT

A vehicle window assembly includes a screen assembly mountable within an opening and a motor operable to move a movable window to engage the screen assembly and hold the screen assembly within the opening. A controller is provided that is configured to operate the motor to apply a desired force against the screen assembly with the movable window to hold the screen assembly within the opening.

15 Claims, 5 Drawing Sheets

(56) References Cited

U.S. PATENT DOCUMENTS

| | | | | |
|---|---|---|---|---|
| 8,595,981 B2* | 12/2013 | Lahnala | ................ | B60J 1/1853 |
| | | | | 49/413 |
| 8,727,419 B2* | 5/2014 | Syvret | ................ | E05F 11/486 |
| | | | | 296/146.2 |
| 8,938,914 B2* | 1/2015 | Hulst | ................ | B60J 1/1853 |
| | | | | 49/128 |
| 9,415,663 B1 | 8/2016 | Soffin et al. | | |
| 9,463,684 B2* | 10/2016 | Lahnala | ................ | B60J 1/16 |
| 10,434,845 B2* | 10/2019 | Murasawa | ................ | B60J 1/18 |
| 10,501,977 B2* | 12/2019 | Snider | ................ | B60J 1/1853 |
| 10,797,374 B1* | 10/2020 | Tengler | ................ | B60J 1/1853 |
| 11,013,069 B2* | 5/2021 | Lahnala | ................ | E05F 11/535 |
| 11,261,633 B2* | 3/2022 | Kuroda | ................ | E05F 15/646 |
| 11,686,144 B2* | 6/2023 | Snider | ................ | E05F 15/659 |
| | | | | 49/360 |
| 11,746,582 B2* | 9/2023 | Snider | ................ | E05D 15/0621 |
| | | | | 49/360 |
| 2004/0100121 A1 | 5/2004 | Bourque et al. | | |
| 2005/0044799 A1 | 3/2005 | Kinross et al. | | |
| 2007/0145775 A1 | 6/2007 | Smith | | |
| 2019/0168585 A1 | 6/2019 | Callaghan | | |
| 2023/0084191 A1* | 3/2023 | Snider | ................ | H05B 3/84 |
| | | | | 296/146.16 |
| 2023/0113049 A1* | 4/2023 | Alam | ................ | E05F 11/382 |
| | | | | 296/146.16 |

\* cited by examiner

SUMMER VENTING WINDOW

CROSS REFERENCE TO RELATED APPLICATION

This application is a divisional application of United States application Ser. No. 16/993,728 filed Aug. 14, 2020, that claims priority to United States Provisional Application Ser. No. 62/896,928 filed Sep. 6, 2019.

TECHNICAL FIELD

This disclosure relates to a motor for an automotive window or other actuated structure.

BACKGROUND

Vehicles are utilized for reasons other than transportation. Many people may use their vehicles as a place to sleep when in remote locations, such as when camping. When sleeping in a vehicle, a window is typically left open. Open windows allow annoying pests, such as bugs to enter the vehicle and disrupt sleeping occupants.

SUMMARY

A vehicle window assembly according to an exemplary aspect of the present disclosure includes, among other possible things, a fixed window disposed on one side of an opening, a movable window that is movable to cover the opening, a screen assembly mountable within the opening, a motor operable to move the movable window over the opening and to engage the screen assembly when the screen assembly is mounted within the opening, and a controller configured to operate the motor to apply a desired force against the screen assembly with the movable window to hold the screen assembly within the opening.

In a further non-limiting embodiment of the foregoing vehicle window assembly, a first seal is disposed on a first side the screen assembly for engaging the movable window.

In a further non-limiting embodiment of any of the foregoing vehicle window assemblies, wherein the first seal includes a length that is less than a length of the first side of the screen assembly.

In a further non-limiting embodiment of any of the foregoing vehicle window assemblies, a fixed seal is disposed on the fixed window and the screen assembly includes a stop on a second side for engaging the fixed seal for securing the screen assembly over the opening.

In a further non-limiting embodiment of any of the foregoing vehicle window assemblies, wherein the stop includes a length that is less than a length of the second side of the screen assembly.

In a further non-limiting embodiment of any of the foregoing vehicle window assemblies, wherein the screen assembly includes at least one hook for holding the screen assembly within the opening.

In a further non-limiting embodiment of any of the foregoing vehicle window assemblies, wherein the controller is configured to operate the motor to close the movable window pane against the screen assembly a distance corresponding with an applied compressive force on the fixed seal.

In a further non-limiting embodiment of any of the foregoing vehicle window assemblies, wherein the controller controls the motor to release the screen assembly in response to a release command that prevents unintended release of the screen assembly.

In a further non-limiting embodiment of any of the foregoing vehicle window assemblies, wherein the release command comprises holding an open switch for a predefined time while the controller prompts display of a release alert.

In a further non-limiting embodiment of any of the foregoing vehicle window assemblies wherein the fixed window comprises a first fixed window on a first side of the opening and a second fixed window on a second side of the opening and the movable window is movable along a track relative to the first fixed window and the second fixed window.

A vehicle window assembly according to another exemplary aspect of the present disclosure includes, among other possible things, a first fixed window on a first side of an opening and a second fixed window on a second side of the opening, a track assembly, a movable window supported in the track assembly, the movable window movable between on the track assembly between a first position and a second position and a screen assembly slidable within the track assembly and attached to the movable window, wherein in the first position, the movable window covers the opening and in the second position, the screen assembly covers the opening.

In a further non-limiting embodiment of the foregoing vehicle window assembly, a clip assembly couples the screen assembly to the moveable window.

In a further non-limiting embodiment of the foregoing vehicle window assemblies, the clip assembly includes a first part attached to the movable window and a second part attached to the screen assembly.

In a further non-limiting embodiment of any of the foregoing vehicle window assemblies, a motor is coupled to the movable window pane for moving the window pane between the first position and the second position.

A method of operating a vehicle window assembly according to another exemplary aspect of the present disclosure includes, among other possible things, operating a motor to move a movable window toward a closed position, measuring a force exerted by the motor within a predetermined distance with a controller electrically controlling the motor, determining that a screen assembly is present in response to the measured force exceeding a predetermined force within the predetermined distance, and stopping movement of the movable window at a predetermined stop distance to hold the screen assembly over an opening with the movable window.

A further non-limiting embodiment of the foregoing method, wherein the predetermined stop distance corresponds with compression of a fixed seal by the screen assembly.

A further non-limiting embodiment of any of the foregoing methods, wherein the predetermined stop distance corresponds with a position of the movable window assembly that holds the screen assembly against the fixed seal.

A further non-limiting embodiment of any of the foregoing methods, including measuring a motor speed and determining that a screen assembly is present in response to the measured motor speed slowing below a predetermined motor speed.

A further non-limiting embodiment of any of the foregoing methods, including remembering that a screen assembly is present and providing a reminder of the presence of the screen assembly when the motor is actuated to move the window toward an open position.

A further non-limiting embodiment of any of the foregoing methods, including releasing the screen assembly with a release command comprising holding an open switch for a predefined time while the controller prompts display of a release alert and moving the movable window assembly toward an open position after display of the release alert for the predefined time.

The various features and advantages of this disclosure will become apparent to those skilled in the art from the following detailed description. The drawings that accompany the detailed description can be briefly described as follows.

DETAILED DESCRIPTION

Figure 1:
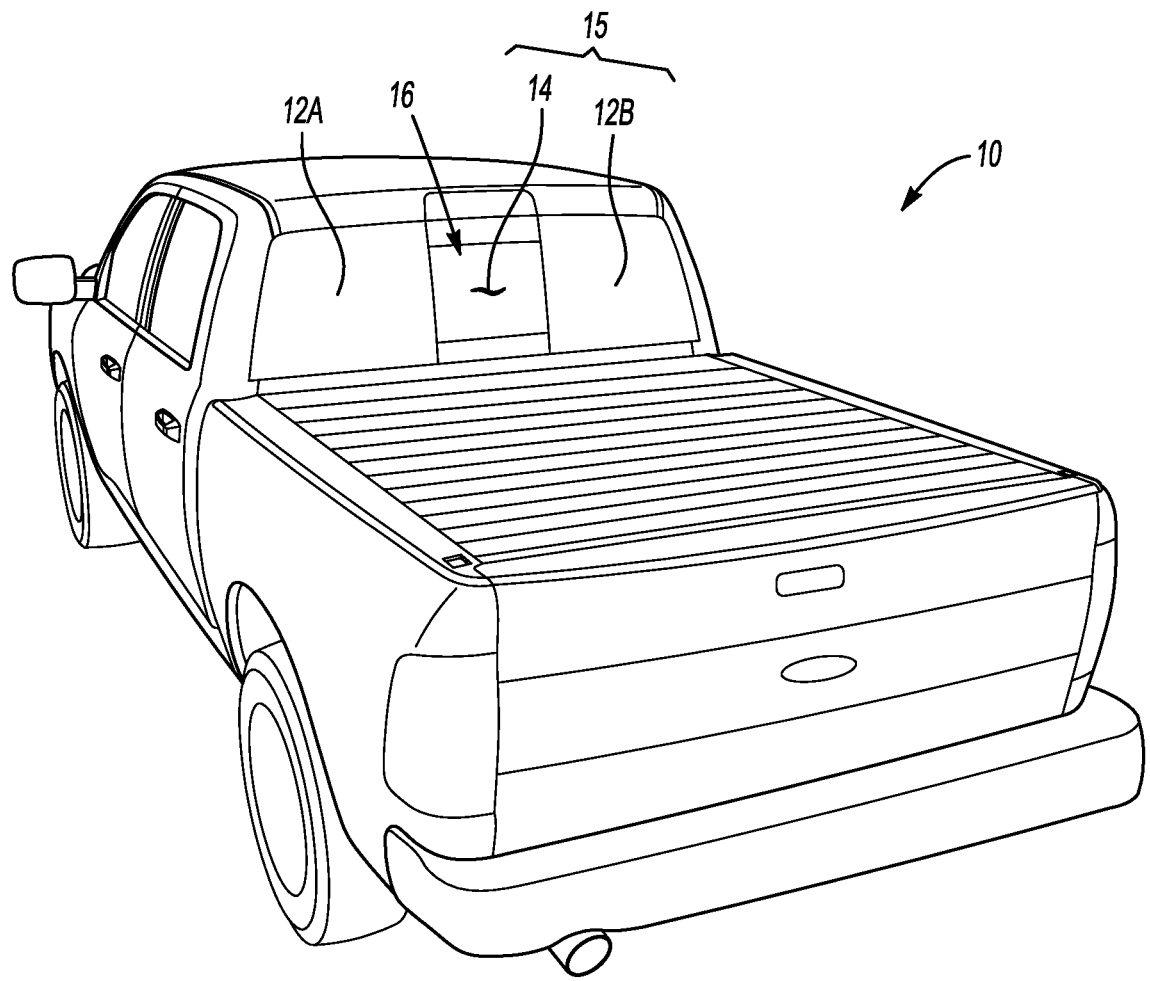
FIG. 1 is a schematic view of a pickup truck with an example rear sliding window assembly embodiment.
Figure 2:
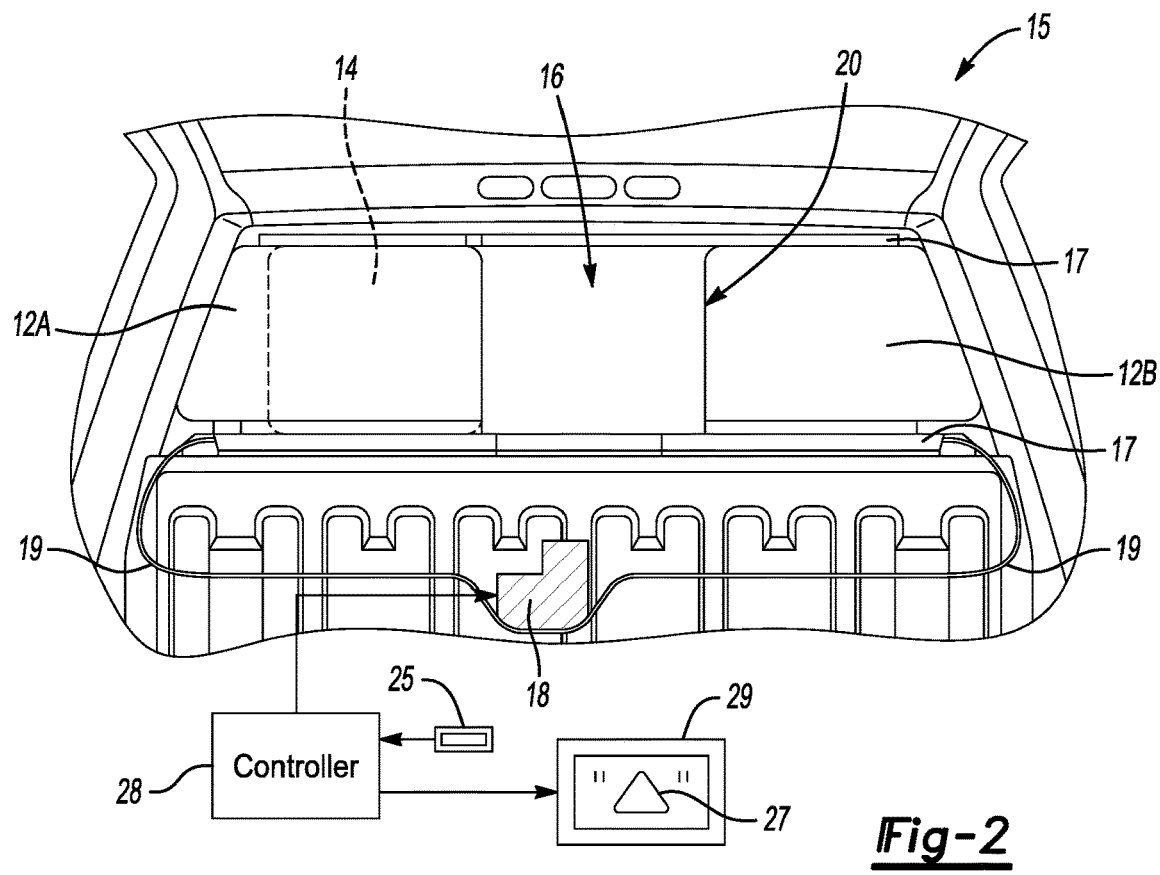
FIG. 2 is an inside view of the example rear sliding window assembly in an open position.

Referring to FIGS. 1 and 2, a vehicle 10 includes a sliding window assembly 15. The assembly 15 includes a first fixed window 12A and second fixed window 12B with an opening 16 therebetween. A movable window 14 is movable along upper and lower tracks 17 between a closed position shown in FIG. 1 and an open position shown in FIG. 2. The example vehicle is a pickup truck and the window assembly is a rear window. However, other vehicles with windows in other locations are within the contemplation of this disclosure.

In this disclosed example, the movable window 14 is moved to one side over the first fixed window 12A to uncover the opening 16 (FIG. 2). A fixed seal 20 is disposed on one side of the opening 16. The seal 20 abuts the movable window 14 when as the window 14 moves between open and closed positions.

An electric motor 18 is coupled to the movable window 14 to move the window 14 between the open and closed positions. The coupling between the motor 18 and the window is by way of drive cables 19. However, other mechanical coupling that provides for movement of the window 14 by the motor 18 is within the contemplation of this disclosure.

A controller 28 is in communication with the motor 18 to govern operation of the window 14. The controller 28 is shown schematically and may be a portion of an overall vehicle control module. The controller 28 includes memory and processors that execute instructions provided by software to control operation of the window assembly 15. The controller 28 is in electrical communication with a switch 25 (shown schematically) disposed within the vehicle cabin and a display 29. The display 29 provides for communication with the vehicle operator of various vehicle operating parameters and status. The display 29 may be a separate display or part of a vehicle information system. The display 29 may be responsive to an operator touch and the switch 25 may be incorporated as a portion of such a touch responsive display. The switch 25 may also be a dedicated mechanical switch.

Figure 3:
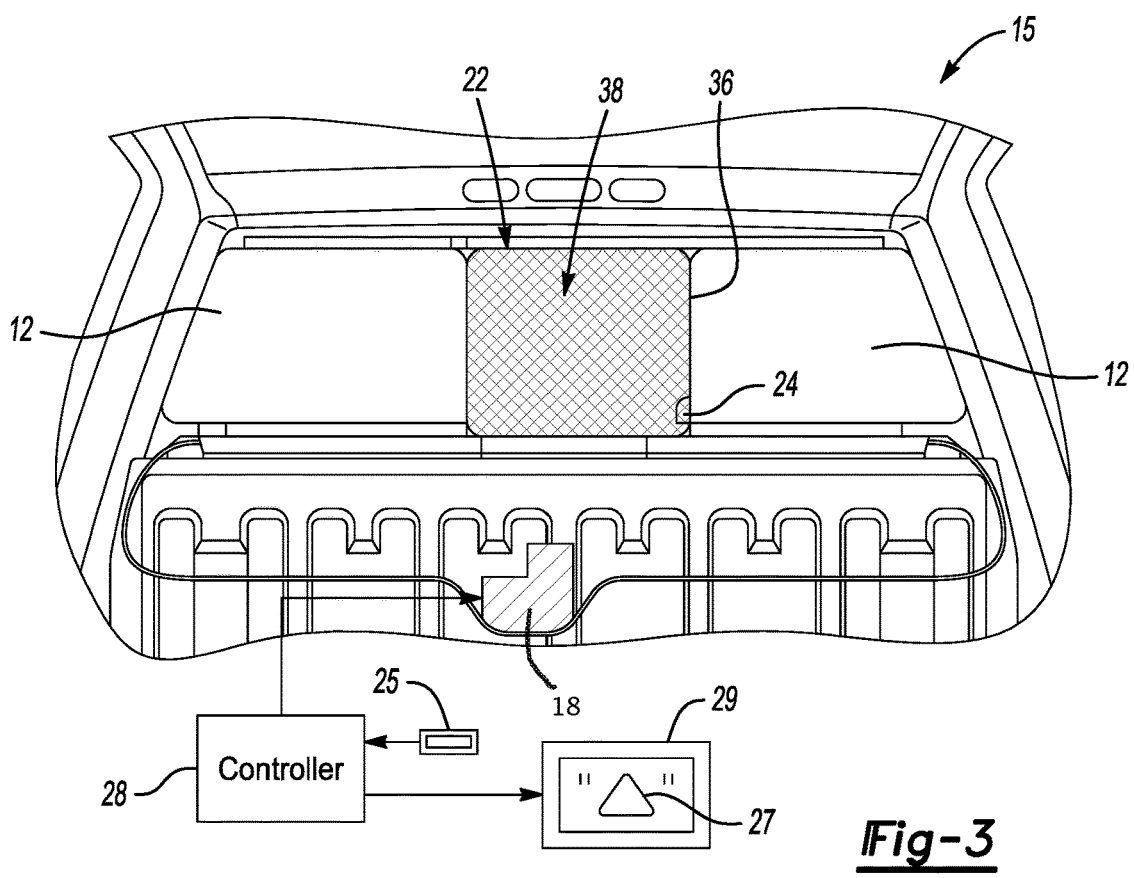
FIG. 3 is an inside view of the example rear sliding window assembly with a screen disposed within an opening.

Referring to FIG. 3, with continued reference to FIGS. 1 and 2, the example assembly 15 includes a screen assembly 22 that may be fit into the opening 16 and is held in place by the movable window 14. The screen assembly 22 provides ventilation while providing a barrier to prevent bugs and other pests from entering the vehicle cabin. The screen assembly 22 may be utilized while the vehicle 10 is operating normally or while the vehicle 10 is parked and utilized for sleeping. The screen assembly 22 is placed into the tracks 17 for the movable window from inside the vehicle cabin and held in place through a partial closing of the movable window 14.

Figure 4:
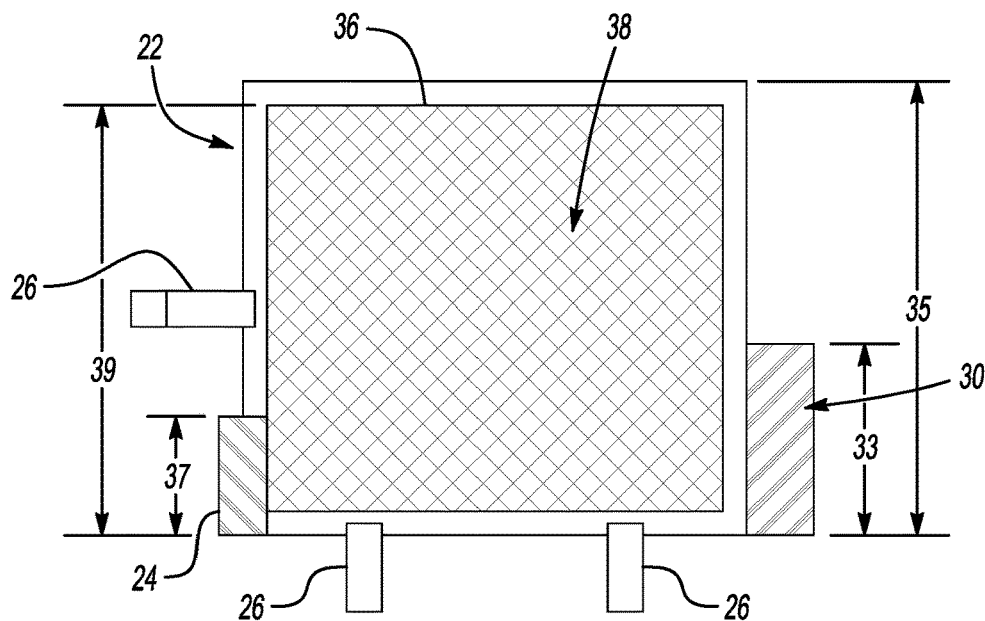
FIG. 4 is a front view of an example screen assembly embodiment.
Figure 5:
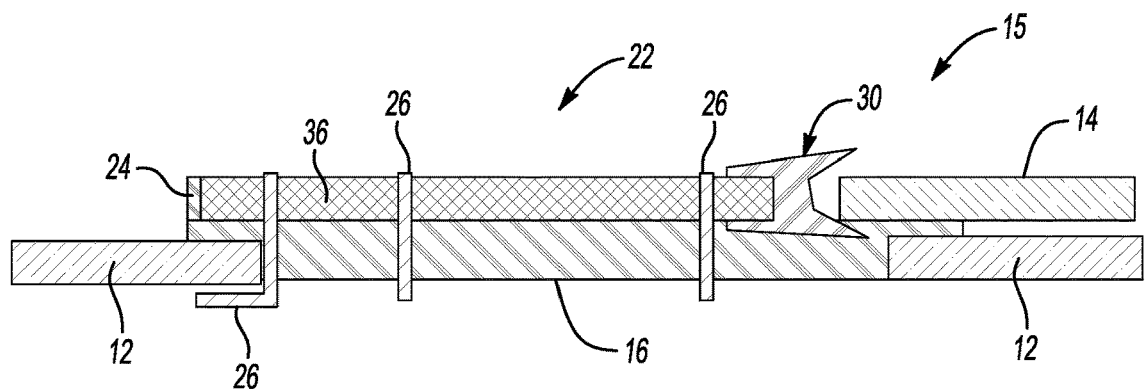
FIG. 5 is a cross-section of the example sliding window assembly with a screen assembly.

Referring to FIGS. 4 and 5, with continued reference to FIGS. 2 and 3, the screen assembly 22 includes a frame 36 surrounding a screen mesh 38. A first seal 30 is disposed on one side of the frame 36 for receiving an edge of the movable window 14. The first seal 30 is substantially U-shaped in cross-section to receive a forward side of the movable window assembly 14. The first seal 30 may extend the entire length of the screen, or only partially along the frame 36. In one disclosed embodiment, the first seal 30 is the entire length of the frame 36. In another disclosed example, the example first seal 30 includes a length 33 that is less than a length 35 of the screen assembly 22. A stop 24 is disposed on an opposite side of the frame 36. The stop 24 is utilized to engage and compress the fixed seal 20 around the opening 16. In one disclosed example, the stop 24 is the length of the frame 36. In another example embodiment, the stop 24 includes a length 37 that is less than a length 39 of the screen frame 36.

Hooks 26 extend from one side and a bottom of the frame 36 for engagement with the outside of the window assembly 15 to partially hold the screen assembly 22 in the opening 16. The hooks 26 can be metal, plastic or other suitable material. The seal 20 disposed around the opening compresses sufficiently to enable the hooks 26 to engage portions of the window assembly around the perimeter of the opening 16.

Figure 6:
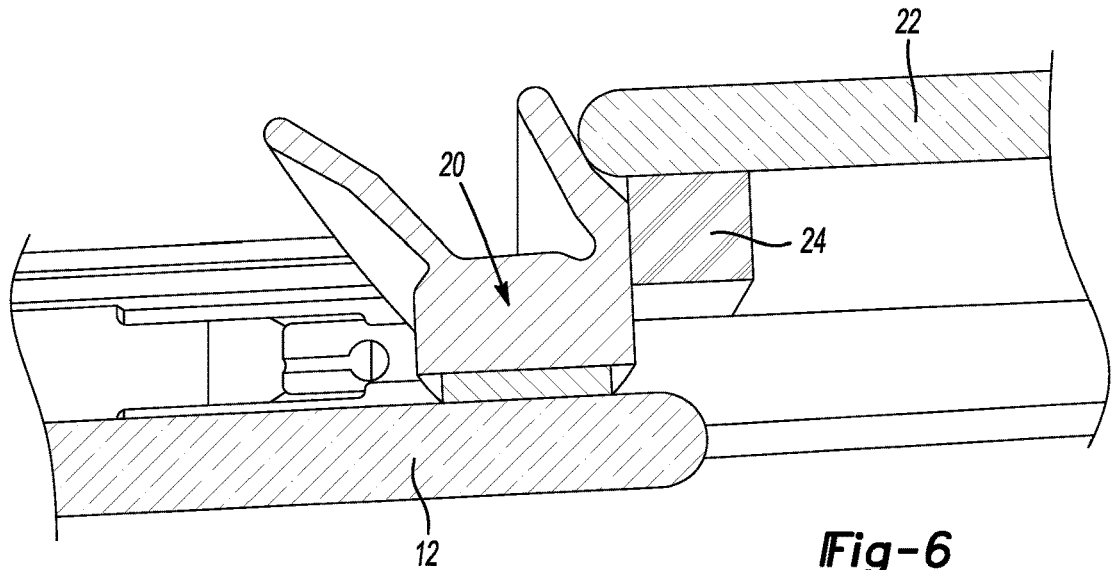
FIG. 6 is perspective view illustrating compression of a fixed seal assembly holding the screen assembly in place.

Referring to FIG. 6 within continued reference to FIGS. 4 and 5, the fixed seal 20 is attached to the fixed glass panes 12. The movable window 14 includes a stop 24. The stop 24 compresses the seal 20 to a desired force to keep the screen assembly 22 in place. The fixed seal 20 is compressible a fixed amount with the application of fixed amount of force. The predefined compressibility of the fixed seal 20 is used to hold the screen assembly 22 in place. Moreover, the known force required to compress the fixed seal 20 is used by the controller 28 to indicate the presence of the screen assembly 22 and initiate the screen holding operation.

Figure 7:
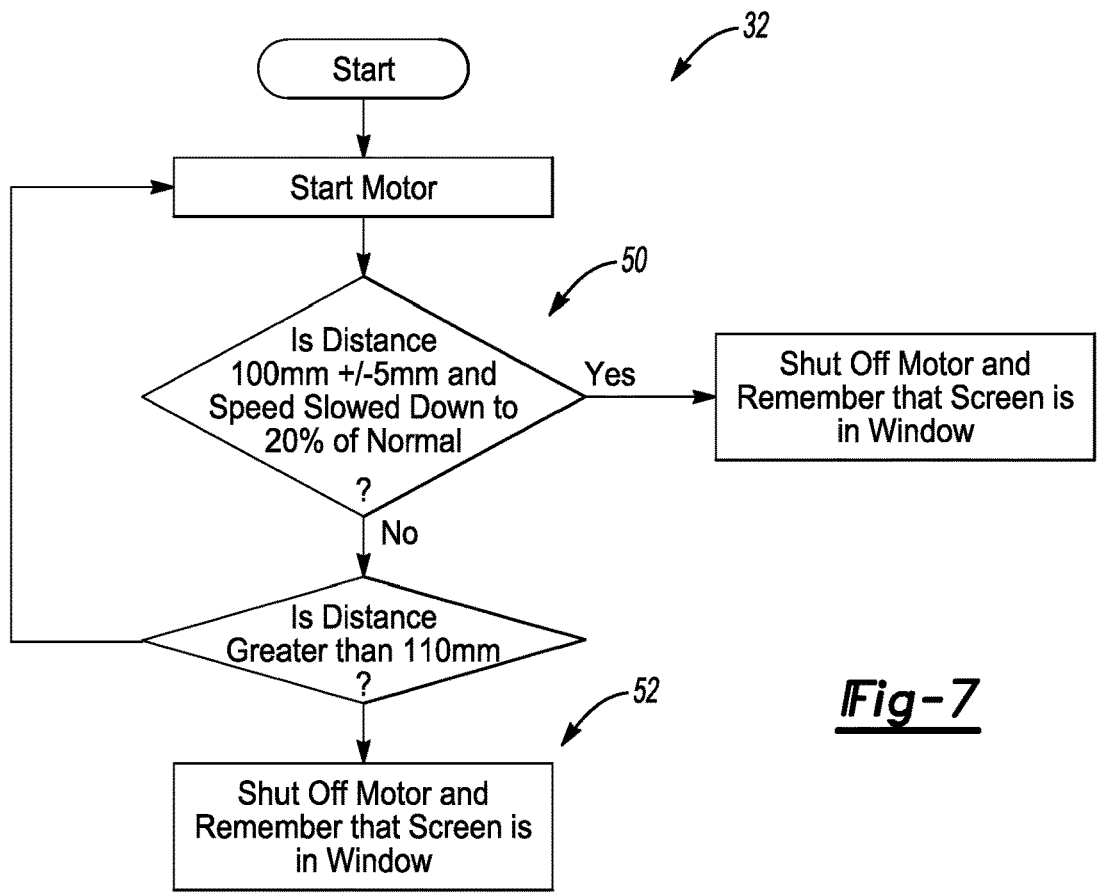
FIG. 7 is a flow chart of operation of the example rear sliding window assembly.
Figure 8:
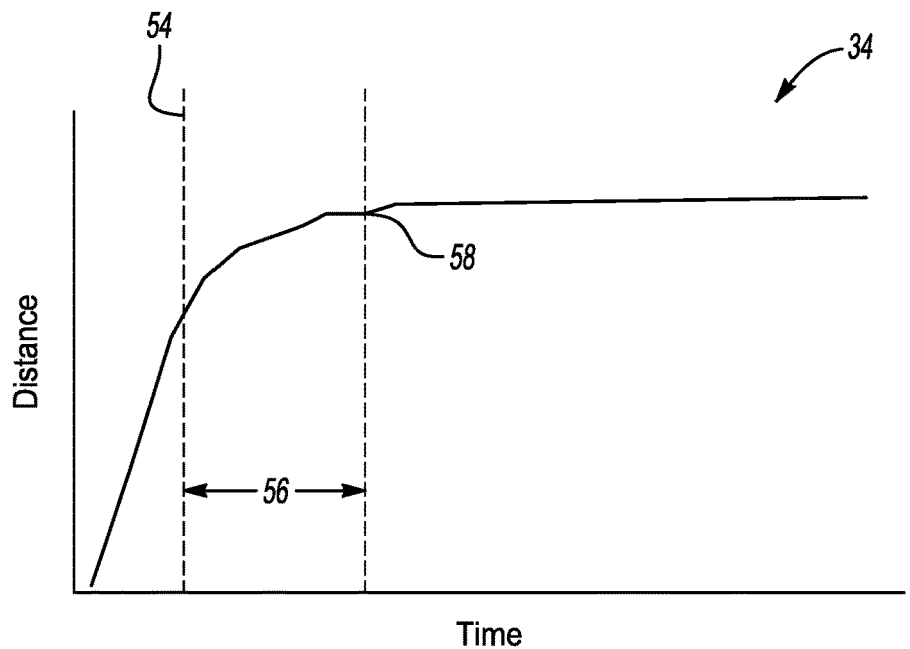
FIG. 8 is a graph illustrating a relationship between distance and time during operation of the example rear sliding window assembly.

Referring to FIGS. 6, 7 and 8 with continued reference to FIGS. 3, 4 and 5, the controller 28 is programmed with a smart window motor control algorithm that controls operation of the movable window 14 to hold the screen assembly 22 in place within the opening 16. The screen assembly 22 is held in place by abutting the sliding window 14 against a seal edge 30 of the screen assembly 22. The controller 28 includes instructions to recognize the presence of the screen assembly 22 and to pinch the screen assembly 22 such that it is locked in place by the sliding window 14. The controller 28 utilizes a position and changing force/current curve for a known distance to determine the presence of the screen assembly 22 instead of any other obstruction that would cause a reversal of the movable window 14. Once the controller 28 recognizes the presence of the screen assembly, the controller 28 enables the application of a predefined amount of force to hold the screen assembly 22 in place.

Referring to FIGS. 7 and 8, the controller 28 is programmed to sense a current rise over a distance due to compression of the seals 20. In one disclosed example, the seal 20 compress at a force of 10 N of force for each 100 mm of travel. It should be appreciated that the disclosed force and travel distance are provided for exemplary purposes and that other force and travel distances are within the contemplation and scope of this disclosure. The predefined force is set in view of a desired compression of the seal 20. In one disclosed example, the controller 28 stops window motion in response to sensing a current indicative of an applied force by the seal of around 70 N. As appreciated, the specific force used to recognize the presence of the screen assembly 22 and stop the motor 18 can vary based on application specific needs to secure the screen assembly 22 in place.

Referring to FIG. 7, a flow chart 32 is shown illustrating operation of an example window assembly 15. In this disclosed example, when the motor 18 is actuated, the controller 28 monitors a current applied to the motor 18 or some other indicator of an applied force. The applied force is utilized as an indicator of compression of the seal 20 and thereby of a position of the movable window 14 relative to the screen assembly 22. In this example, the controller 18 slows and then stops the motor 18 at a distance of approximately 100 mm and a speed that has slowed by approximately 20% as indicated at 50. The controller 28 uses a predefined criterion to recognize the presence of the screen assembly 22 and stop the window pane 14 as indicated at 52. In this example, the predefined criterion is a force exerted by the motor 18 as it encounters resistance to movement of the movable window 14 from the screen assembly 22 compressing the seal 20.

Referring to FIG. 8, a distance time curve for the movable window 14 is shown to illustrate operation of the sliding window 14 based on the distance that the seal 20 is compressed. In this disclosed example, a resistance force encountered by the motor 18 is initially felt upon engagement of the seal 20 as indicated at 54. Continued movement of the window 14 results in an increased force and compression over a time indicated at 56 until reaching a predetermined distance shown at 58. The distance 58 represents a predefined amount of compression of the seal 20. The attained distances and force feedback on the motor 18 triggers the motor 18 to stop and hold the window 14 in place to trap the screen assembly 22 in place.

During operation of the movable window 14, the forces would not increase within the distance indicated in chart 34. Instead, the movable window 14 would freely move to the closed position. However, once the screen assembly 22 is inserted, movement of the movable window 14 causes an early increase in force on the motor 18 that is sensed and utilized by the controller 28 to recognize the presence of the screen assembly 22. Once the controller 28 recognizes that the screen assembly 22 is present, the controller 28 will operate the motor 18 in accordance with the instructions provided to enable securement of the screen assembly 22 by the movable window 14.

Once the motor 18 is stopped and the screen assembly 22 is held in place, the controller 28 remembers that the screen assembly 22 is present. The controller 28 will then operate to open the movable window 14 according to instructions accounting for the presence of the screen assembly. The controller 28 operates according to a release routine that accounts for the presence of the screen assembly 22. The release routine prevents unintentional opening of the window, such as when going down the road, etc. One disclosed example release routine requires holding the switch 25 for a predefined time such as for example 5 seconds while a release alert 27 is displayed on the display 29 (FIG. 3) and/or a chime is sounding that the window 14 is being opened with the screen assembly 22 present. As appreciated, other release routines may be utilized to assure that the sliding window 14 is opened with knowledge of the presence of the screen assembly 22.

Accordingly, the example window assembly 15 provides a screen 22 that fits in existing windows using hooks on two sides. The stop 24 is on leading side of the screen assembly 22 and compresses the fixed seal 20. Compression of the fixed seal is used to implement slowing of the motor 18 as the movable window 12 engages the screen assembly 22 making it easier to recognize when to stop the motor 18. Further, compression of the fixed seal 20 seals the screen assembly 22 on one providing a barrier from bugs entering the vehicle cabin. The disclosed controller 28 is programmed to recognize the presence of the screen assembly 22 and operate the motor 18 to position the movable window 14 to hold the screen assembly 22 in place. The controller 28 s further programmed to prevent unintended opening of the movable window 14 when the screen assembly 22 is in use.

Figure 9:
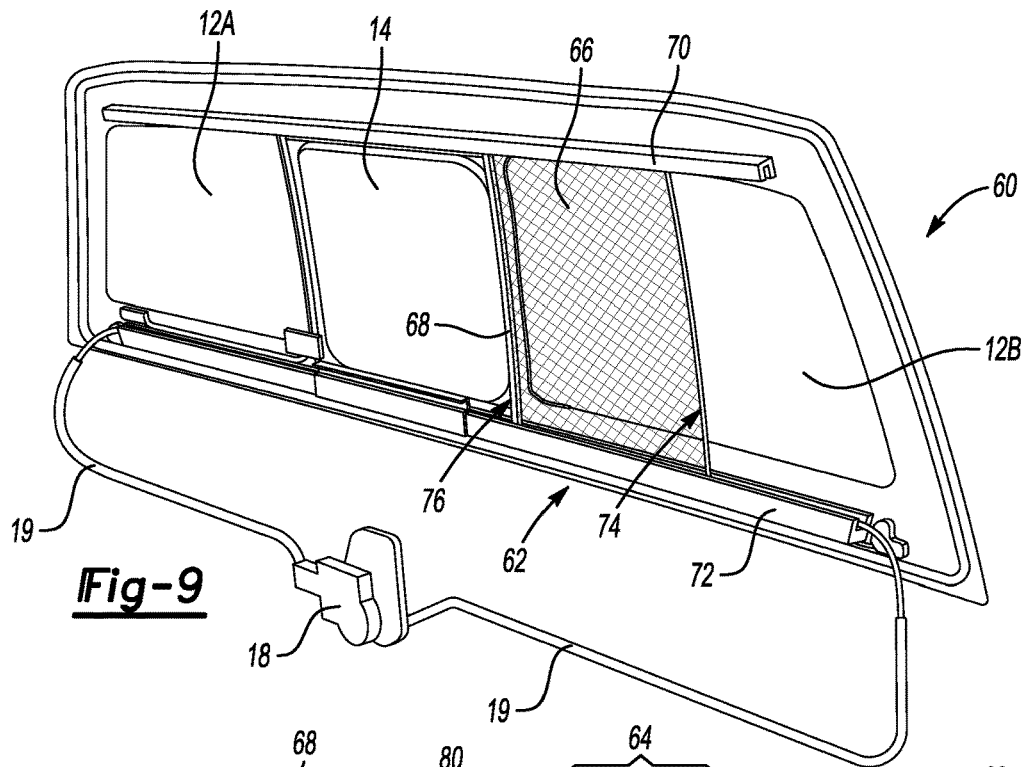
FIG. 9 is a perspective view of another rear sliding window assembly embodiment.
Figure 10:
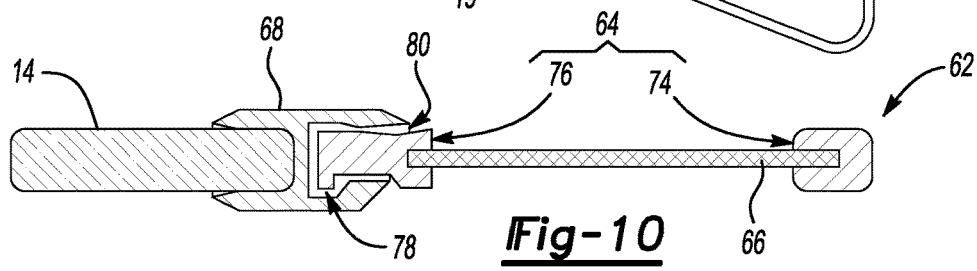
FIG. 10 is a sectional view of a portion of the rear sliding window assembly.

Referring to FIGS. 9 and 10 another example window assembly embodiment is shown and indicated at 60. The window assembly 60 includes a screen assembly 62. The screen assembly 62 includes a mesh screen 66 supported within a frame 64 with a first side 76 and a second side 74. A clip 68 secures the screen assembly 62 to a movable window 14. The clip 68 may be an integral part of the screen frame 64, part of the movable window 14 or a separate part. In this example, the clip 68 is a separate part that is attached to the moveable window 14 on one side and the first side 76 of the frame 64. The first side 76 includes a tab 78 that fits within a channel 80 of the clip 68.

Both the movable window 14 and screen assembly 62 are movably supported by a top track 70 and a bottom track 72. The top and bottom tracks 70, 72 are disposed parallel to each other across top and bottom parts of the window assembly 60. A motor 18 is coupled by way of drive cables 19 to the movable window 14. The motor 18 is thereby operable to drive the window 14 along the tracks 70, 72. The top and bottom tracks 70,72 are elongated across the window assembly 60 accommodate a width of both the window 14 and the screen assembly 62.

In this example embodiment, the clip 68 is removable such that the screen assembly 62 is removable if desired. The screen assembly 62 is installed by sliding the frame 64 into the channels 70, 72 and securing the screen assembly 62 to the moveable window 14 with the clip 68.

The example window assembly 60 is shown in a first position (FIG. 9) with the sliding glass pane 14 covering the opening 16. The screen assembly 62 is attached to the sliding glass pane 14 by the clip 68.

Figure 11:
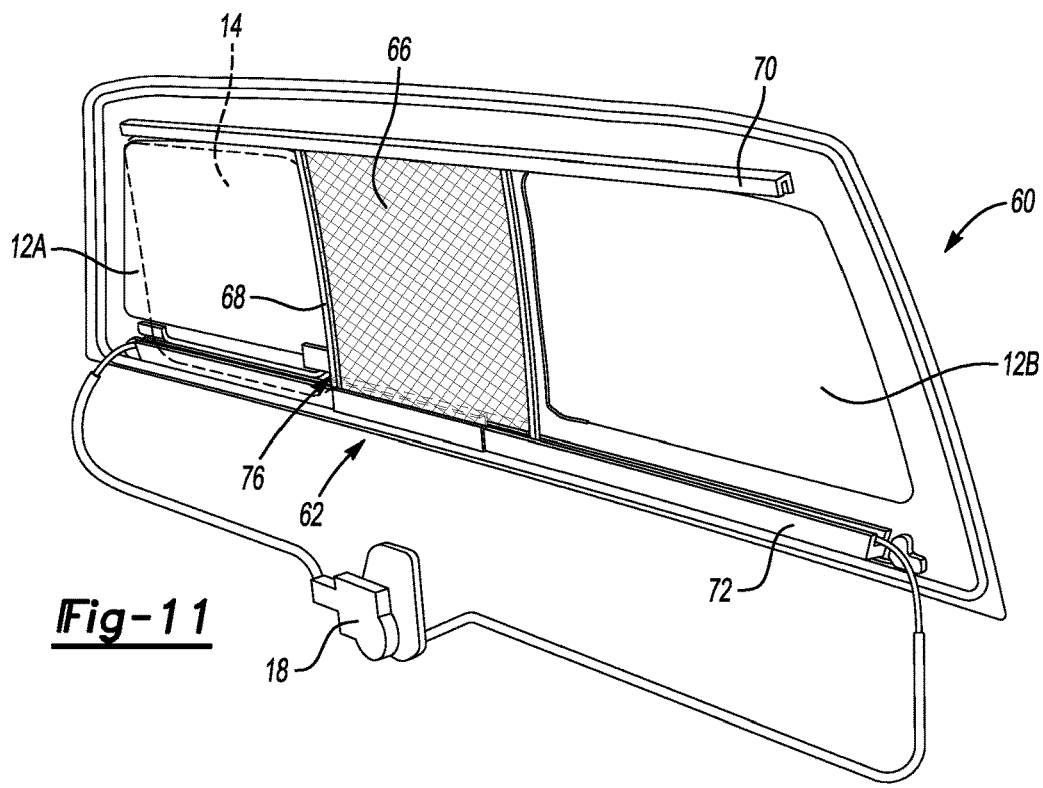
FIG. 11 is a perspective view of the rear sliding window assembly with the sliding glass in an open position and a screen assembly covering the opening.

Referring to FIG. 11, actuation of the motor 18 causes the movable window 14 to slide sideways away from the opening. As the movable window 14 slides away from the opening 16, the screen assembly 62 is pulled over the opening 16. To reclose the opening 16 with the window 14, operation is reversed such that the window 14 is slide over the opening as the screen assembly 62 is moved along to the other side.

The disclosed example window assembles provides a screen that fits into existing window systems behind a driver so a rear view is not compromised. The screen assembly is removable and replaceable by a customer.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle window assembly comprising:
   a first fixed window on a first side of an opening and a second fixed window on a second side of the opening;
   a track assembly;
   a movable window supported in the track assembly, the movable window movable between on the track assembly between a first position and a second position;
   a screen assembly slidable within the track assembly and attached to the movable window, wherein in the first position, the movable window covers the opening and in the second position, the screen assembly covers the opening; and
   a clip assembly coupling the screen assembly to the moveable window, wherein the clip assembly is removable from the moveable window.

2. The assembly as recited in claim 1, wherein the clip assembly includes a first part attached to the movable window and a second part attached to the screen assembly.

3. The assembly as recited in claim 2, including a motor coupled to the movable window pane for moving the window between the first position and the second position.

4. The assembly as recited in claim 3, wherein the motor is coupled to the movable window through at least one drive cable.

5. The assembly as recited in claim 1, wherein the track assembly includes a top track and a bottom track.

6. The assembly as recited in claim 1, wherein the screen assembly includes a mesh screen disposed within a frame having a first side and a second side.

7. The assembly as recited in claim 6, wherein the first side is attachable to the clip with a tab that is received within a channel.

8. The assembly as recited in claim 7, wherein the tab is disposed on the first side and the channel is defined within the clip.

9. The assembly as recited in claim 1, wherein the track assembly extends a width across the entire window assembly that is greater than a width of the movable window combined with a width of the screen assembly.

10. A vehicle window assembly comprising:
    a fixed window disposed on one side of an opening;
    a movable window that is movable to cover the opening;
    a screen assembly attachable to the movable window; and
    a motor operable to move the movable window between a closed position where the movable window covers the opening and an open position where the screen assembly covers the opening, wherein the screen assembly is attachable to the movable window through a tab that is at least partially received within a channel when the moveable window is attached to the screen assembly.

11. The vehicle window assembly as recited in claim 10, including a track assembly, wherein the movable window and the screen assembly are movable within the track assembly.

12. The vehicle window assembly as recited in claim 10, including a clip having first portion attachable to the movable window and a second portion attachable to the screen assembly.

13. The vehicle window assembly as recited in claim 12, wherein the screen assembly includes a mesh screen disposed within a frame having a first side and a second side, the first side including a tab that is receivable within a channel defined by the clip.

14. The vehicle window assembly as recited in claim 10, including a drive link coupled between the motor and the movable window.

15. The vehicle window assembly as recited in claim 10, including a controller for controlling the motor to position the movable window or the screen assembly within the opening.

* * * * *